June 24, 1930. W. I. JONES 1,767,527
LUBRICATING APPARATUS
Filed Oct. 9, 1926
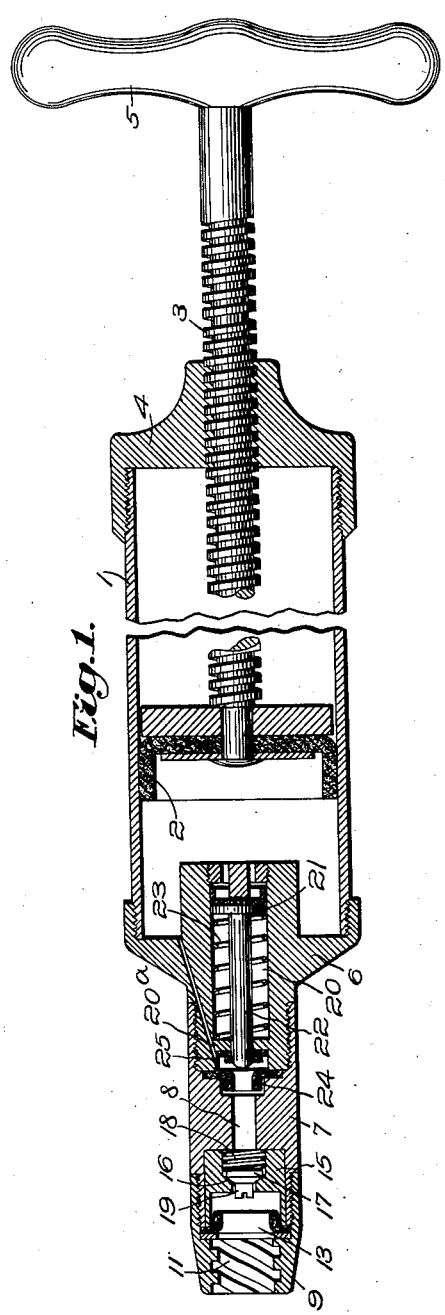
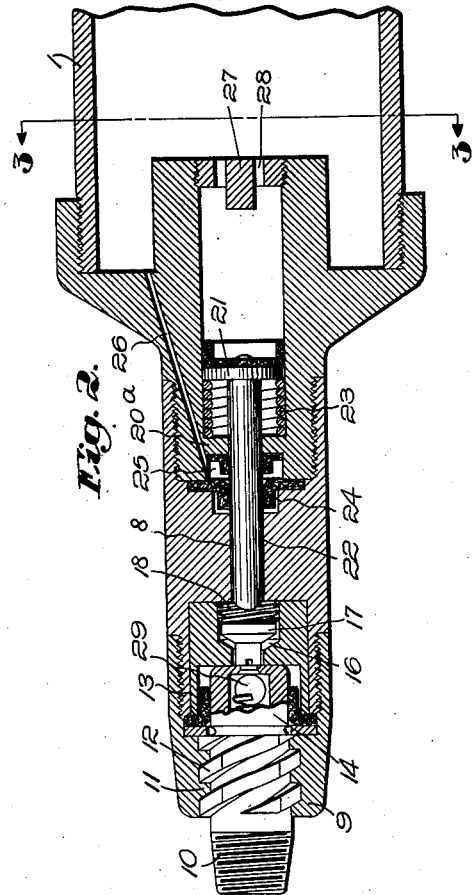
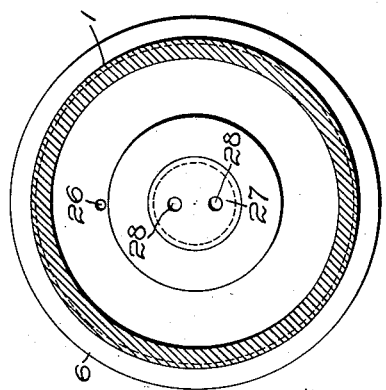
Inventor:
Walter I. Jones
by Emery, Booth, Janney & Varney
Atty's Patented June 24, 1930

1,767,527

UNITED STATES PATENT OFFICE

WALTER I. JONES, OF ARLINGTON, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING APPARATUS

Application filed October 9, 1926. Serial No. 140,493.

This invention aims to provide improvements in lubricating apparatus of the type generally known as a lubricant gun.

In the drawings, which illustrate a preferred embodiment of my invention:

Figure 1 is a longitudinal section through the gun, portions thereof being in elevation, and showing the relation of parts when the gun is not in operation;

Fig. 2 is an enlarged section of the discharge end of the gun engaged with a cooperating nipple and being partly in elevation, also showing the relation of parts when lubricant is forced to the nipple under relatively high potential pressure; and Fig. 3 is a section on the line 3—3 of Fig. 2.

Referring to the embodiment of my invention illustrated by the drawings, I have shown in Fig. 1 a barrel 1, having a piston 2 adapted to be reciprocated therein by a piston stem 3, screw threaded into the rear head 4. A handle 5 is attached to the outer end of the stem to provide for turning thereof in either direction.

A front head 6 is attached to the front end of the barrel 1, and this in turn carries a part 7 which is bored to provide a high pressure chamber 8 of relatively small cross-sectional area. The part 7 has a nozzle part 9 secured to it for cooperative engagement with a nipple 10, as shown by Fig. 2.

The nozzle 9 may be of any suitable construction which will cooperate with the particular type of nipple to be used therewith. For purposes of illustration, however, I have selected a nozzle part 9 which is bored and provided with internal threads 11 for coupling engagement with the male threads 12 of the nipple, as shown in Fig. 2. Beyond the female threads 11, I have provided a hat washer 13, which is adapted to surround the smooth end portion 14 of the nipple and be pressed tightly thereagainst by the lubricant to provide a lubricant-tight seal between the gun and nipple.

The outer end of the part 7 is provided with a relatively large bore into which is fitted a part 15 presenting a valve seat 16. A valve 17 is normally pressed against the seal (Fig. 1) by a spring 18. The valve is provided with a forwardly projecting stem 19, which may be engaged by the end of the nipple, during coupling operation, to unseat the valve. The front head 6 is bored to provide a chamber 20 of somewhat larger cross-sectional area than the chamber 8. Both chambers are aligned and separated by a partition 20ª. A differential piston having a portion 21 fitting the wall of the chamber 20, and a reduced portion 22, which may fit the wall of the chamber 8, is reciprocable in the chambers 8 and 20, as shown in Figs. 1 and 2. A spring 23 is positioned in the chamber 20 and normally urges the piston into the position shown in Fig. 1, the free end of the reduced portion 21 being positioned between two hat washers 24 and 25. The washer 24 surrounds the reduced portion 22 of the piston at all times to prevent passage of lubricant around the reduced portion into the chamber 20. Normally there is a free passage around the end of the reduced portion 22 through the washer 25 so that lubricant may pass from the barrel through the passage 26 in the head 6 directly into the high pressure chamber 8. A plug 27 is screwed into the end of the head 6 to close the chamber 20 so that the spring 23 cannot urge the piston 21 out of the chamber. Holes 28 are drilled through the plug 27 to admit lubricant into the chamber 20 for operation of the piston.

Assuming that the parts of the gun are in the relation to each other shown in Fig. 1, the gun may be engaged with the nipple 10 by introducing the nozzle over the smooth end 14 of the nipple and turning the gun, as a unit, in a clockwise direction. The threads 11 of the nozzle 9 will then engage the threads 12 of the nipple and draw the nozzle over the nipple as shown in Fig. 2. During the coupling operation the smooth portion 14 of the nipple passes through an aperture in the hat washer 13 and the end of the nipple engages with the stem 19 of the valve 17, thereby unseating the valve as illustrated.

Rotation of the handle 5 in a clockwise direction relative to the remainder of the gun, after coupling has been completed, forces the piston 2 inwardly relative to the barrel 1 thereby forcing lubricant under relatively low potential pressure from the barrel 1. The lubricant flows through the passage 26 into and through the high pressure chamber 8, past the closure valve 17 and past the ball check valve 29 (Fig. 2) into the lubricant-receiving nipple 10. Lubricant forced to a bearing through the nipple 10 in the manner above described will be under sufficient pressure to lubricate a bearing which is free from dirt or hardened lubricant, and the spring 23 is strong enough to prevent operation of the differential piston when the bearing is free. If, however, a bearing is clogged and cannot be lubricated by lubricant under low pressure, the pressure of the lubricant in the chamber 8 may be greatly increased by the forward movement of the differential piston to compress the lubricant in the chamber 8.

While heretofore a certain amount of manipulation was required to increase the pressure of lubricant which could be ejected from a given gun, this gun is automatic in its operation and increased pressure is a natural result when a tight bearing is reached.

Assuming that the gun is connected to a nipple in the same manner as above described, but that the nipple is in this instance connected to a bearing which cannot receive lubricant under the low potential pressure, the first thing that happens when the handle 5 is turned in a clockwise direction is the compressing of the lubricant between the bearing and the piston 2 until the pressure is sufficient to move the piston in the chambers 20 and 8. As the reduced portion 22 of the piston moves forwardly, it enters an aperture through the hat washer 25 and cuts off the supply of lubricant. From this point on the lubricant trapped in the chamber 8 is compressed until the potential pressure is great enough to dislodge the foreign matter in the bearing and flow freely thereto.

After a bearing has been lubricated by lubricant under high pressure, the handle 5 should be turned in a contra-clockwise direction sufficiently to relieve the pressure of the lubricant in the barrel 2 so that the spring 23 may move the differential piston to its normal position. The gun is then ready for further operation.

While I have shown and described a preferred embodiment of my invention, it should be understood that I have done so for purposes of clarification rather than limitation, my invention being best defined in the following claims.

Claims:

1. A lubricant compressor comprising a low pressure cylinder, a piston in said cylinder, a high pressure cylinder in communication with said low pressure cylinder, a high pressure piston in said high pressure cylinder actuated automatically upon the creation of a predetermined pressure in said low pressure cylinder to discharge lubricant from said high pressure cylinder, means for effecting a mechanically interlocking connection with a lubricant-receiving fitting, said means rigidly carried by said high pressure cylinder, and a single handle for connecting said compressor to a lubricant-receiving fitting and discharging lubricant from said compressor at both high and low pressure.

2. In lubricant apparatus of the class described, a low pressure cylinder, a piston therein, a handle operable in one direction to advance said piston, a high pressure cylinder in communication with said low pressure cylinder, a differential piston exposed to the pressure of lubricant in said low pressure cylinder and reciprocable in said high pressure cylinder for discharging lubricant from said high pressure cylinder upon the creation of a predetermined pressure in said low pressure cylinder, and interlocking means rigid with said high pressure cylinder, said interlocking means operated to interlock with a lubricant-receiving nipple upon movement of said handle in lubricant-discharging direction.

3. Lubricating apparatus comprising, in combination, a supply barrel, means for compressing the lubricant in said barrel, a nozzle for making a quick detachable lubricant-tight engagement with a lubricant-receiving nipple, said nozzle rigid with said supply barrel, means providing a high pressure chamber of relatively small cross-sectional area and a chamber of larger cross-sectional area aligned with said first-mentioned chamber, conduit means connecting said first-mentioned chamber with the supply barrel, a differential piston operable by the pressure of the lubricant in said barrel to force lubricant from said first-mentioned chamber under increased potential pressure, and a handle for operating the compressing means in said barrel and connecting said apparatus with a lubricant-receiving nipple.

4. Lubricating apparatus comprising, in combination, a supply barrel, means for compressing the lubricant in said supply barrel, a nozzle for making a quick detachable lubricant-tight engagement with a lubricant-receiving nipple, means providing a high pressure chamber of relatively small cross-sectional area, a chamber of larger cross-sectional area aligned with said first-mentioned chamber, conduit means connecting said first-mentioned chamber with the supply barrel, a differential piston operable by the pressure of the lubricant in said barrel to force lubricant from said first-mentioned chamber under substantially increased potential pressure, an inwardly opening closure valve at the outer end of said first-mentioned chamber for preventing escape of lubricant therefrom when the nozzle is not engaged with a nipple, and a single means for operating said compressing means and said nozzle to effect a connection with a lubricant-receiving nipple and force lubricant thereinto.

5. In high pressure lubricating apparatus of the class described, a supply barrel, means for compressing the lubricant in said barrel, a nozzle for making a quick detachable lubricant-tight engagement with a lubricant-receiving nipple, means providing a high pressure chamber of relatively small cross-sectional area, a chamber of larger cross-sectional area aligned with said first-mentioned chamber, conduit means connecting said first-mentioned chamber with the supply barrel and a differential piston operable by the pressure of the lubricant in said barrel to force lubricant from said first-mentioned chamber under substantially increased potential pressure, and a flexible washer intersecting said first-mentioned chamber in front of the point where said conduit empties into said chamber thereby to provide for lubricant-tight engagement with the reduced portion of said piston to prevent passage of lubricant around said piston when forcing lubricant from said chamber under high potential pressure.

6. In high pressure lubricating apparatus of the class described, a supply barrel, means for compressing the lubricant in said barrel, a nozzle for making a quick detachable lubricant-tight engagement with a lubricant-receiving nipple, means providing a high pressure chamber of relatively small cross-sectional area, a chamber of larger cross-sectional area aligned with said first-mentioned chamber, separate passages connecting said chambers with the barrel to receive lubricant under pressure therefrom, a differential piston operable in said chambers, a spring adapted to overcome movement of said piston until the pressure of the lubricant is insufficient to force lubricant into the nipple, the lubricant under pressure thereby acting upon said piston in said second chamber to force lubricant under relatively increased potential pressure from said first-mentioned chamber to the nipple, and a hat-washer intersecting said first-mentioned chamber for annular engagement with the reduced portion of said piston to prevent leakage of lubricant by said piston in either direction when being forced from said first-mentioned chamber, said spring also acting to return said piston after its operation and upon reduction of the pressure in said barrel.

In testimony whereof, I have signed my name to this specification.

WALTER I. JONES.